| (12) | United States Patent | (10) Patent No.: | US 12,371,542 B2 |
|---|---|---|---|
| | Sugiyama et al. | (45) Date of Patent: | Jul. 29, 2025 |

(54) LIQUID CRYSTAL POLYESTER RESIN COMPOSITION, METHOD FOR PRODUCING SAME AND MOLDED BODY OF SAME

(71) Applicant: SUMITOMO CHEMICAL COMPANY, LIMITED, Tokyo (JP)

(72) Inventors: Takayuki Sugiyama, Tsukuba (JP); Tasuku Tamura, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 748 days.

(21) Appl. No.: 17/633,406

(22) PCT Filed: Aug. 4, 2020

(86) PCT No.: PCT/JP2020/029748
§ 371 (c)(1),
(2) Date: Feb. 7, 2022

(87) PCT Pub. No.: WO2021/029265
PCT Pub. Date: Feb. 18, 2021

(65) Prior Publication Data
US 2022/0289925 A1 Sep. 15, 2022

(30) Foreign Application Priority Data
Aug. 9, 2019 (JP) ................................. 2019-148163

(51) Int. Cl.
*C08J 5/24* (2006.01)

(52) U.S. Cl.
CPC ............... *C08J 5/248* (2021.05); *C08J 5/243* (2021.05); *C08J 2367/02* (2013.01)

(58) Field of Classification Search
CPC .......................................................... C08J 5/24
USPC ....................................................... 523/215
See application file for complete search history.

(56) References Cited

U.S. PATENT DOCUMENTS

| 6,120,894 | A | 9/2000 | Yamamoto et al. | |
|---|---|---|---|---|
| 6,432,323 | B1 | 8/2002 | Maeda et al. | |
| 2011/0114883 | A1 | 5/2011 | Murouchi et al. | |
| 2014/0228519 | A1 | 8/2014 | Nakayama et al. | |
| 2014/0329075 | A1* | 11/2014 | Ichikawa ............... | D06M 13/11 427/386 |
| 2015/0210813 | A1* | 7/2015 | Arai ...................... | C08K 5/1515 428/298.7 |
| 2015/0247025 | A1* | 9/2015 | Ichikawa ................. | C08J 5/06 427/398.1 |
| 2019/0112473 | A1 | 4/2019 | Tsuchiya et al. | |
| 2019/0241711 | A1* | 8/2019 | Komatsu ............... | C08G 63/605 |

FOREIGN PATENT DOCUMENTS

| CN | 102161817 | A | 8/2011 | |
|---|---|---|---|---|
| EP | 4 011 942 | A1 | 6/2022 | |
| JP | 10-077350 | A | 3/1998 | |
| JP | 2001-026702 | A | 1/2001 | |
| JP | 3301099 | B2 | 7/2002 | |
| JP | 2002-220786 | A | 8/2002 | |
| JP | 2003-181833 | A | 7/2003 | |
| JP | 3562152 | B2 | 9/2004 | |
| JP | 2007-016071 | A | 1/2007 | |
| JP | 2009-242456 | A | 10/2009 | |
| JP | 2012-057277 | A | 3/2012 | |
| JP | 2013-104156 | A | 5/2013 | |
| JP | 5316618 | B2 | 10/2013 | |
| JP | 2014-098134 | A | 5/2014 | |
| JP | 2015-189896 | A | 11/2015 | |
| JP | 2018-188496 | A | 11/2018 | |
| JP | 2019-073657 | A | 5/2019 | |
| JP | 2019-108543 | A | 7/2019 | |
| WO | WO-2018021389 | A1 * | 2/2018 | ........... C08G 63/605 |

OTHER PUBLICATIONS

Japanese Notice of Reasons for Refusal issued in corresponding Japanese Patent Application No. 2019-148163, dated Feb. 25, 2020, with English translation.
International Search Report issued in corresponding International Patent Application No. PCT/JP2020/029748, dated Oct. 27, 2020, with English translation.
European Search Report issued in corresponding European Patent Application No. 20852269.8-1014 dated Jul. 24, 2023.
Office Action issued in corresponding Taiwanese Patent Application No. 109126297, dated Nov. 22, 2023 w/ English MT.
Chinese Office Action issued in corresponding Chinese Patent Application No. 202080056229.0, dated May 24, 2023, with English translation.
Chinese Office Action issued in corresponding Chinese Patent Application No. 202080056229.0, dated Jan. 20, 2023, with English translation.

* cited by examiner

*Primary Examiner* — Deve V Hall
(74) *Attorney, Agent, or Firm* — Rimon P.C.

(57) ABSTRACT

The present invention relates to: a liquid crystal polyester resin composition which contains a liquid crystal polyester resin and carbon fibers with a sizing agent; and a method for producing this liquid crystal polyester resin composition. The content of the carbon fibers with a sizing-agent is from 5 parts by mass to 120 parts by mass relative to 100 parts by mass of the liquid crystal polyester resin. With respect to the carbon fibers with a sizing-agent, the adhesion amount of the sizing agent with respect to the carbon fibers is from 0.1 parts by mass to 1.2 parts by mass relative to 100 parts by mass of the carbon fibers. If the carbon fibers with a sizing agent are heated from 25° C. to 400° C. in the air at a heating rate of 50° C./min, the mass loss rate within the range from 300° C. to 400° C. is less than 0.8% by mass.

6 Claims, 1 Drawing Sheet

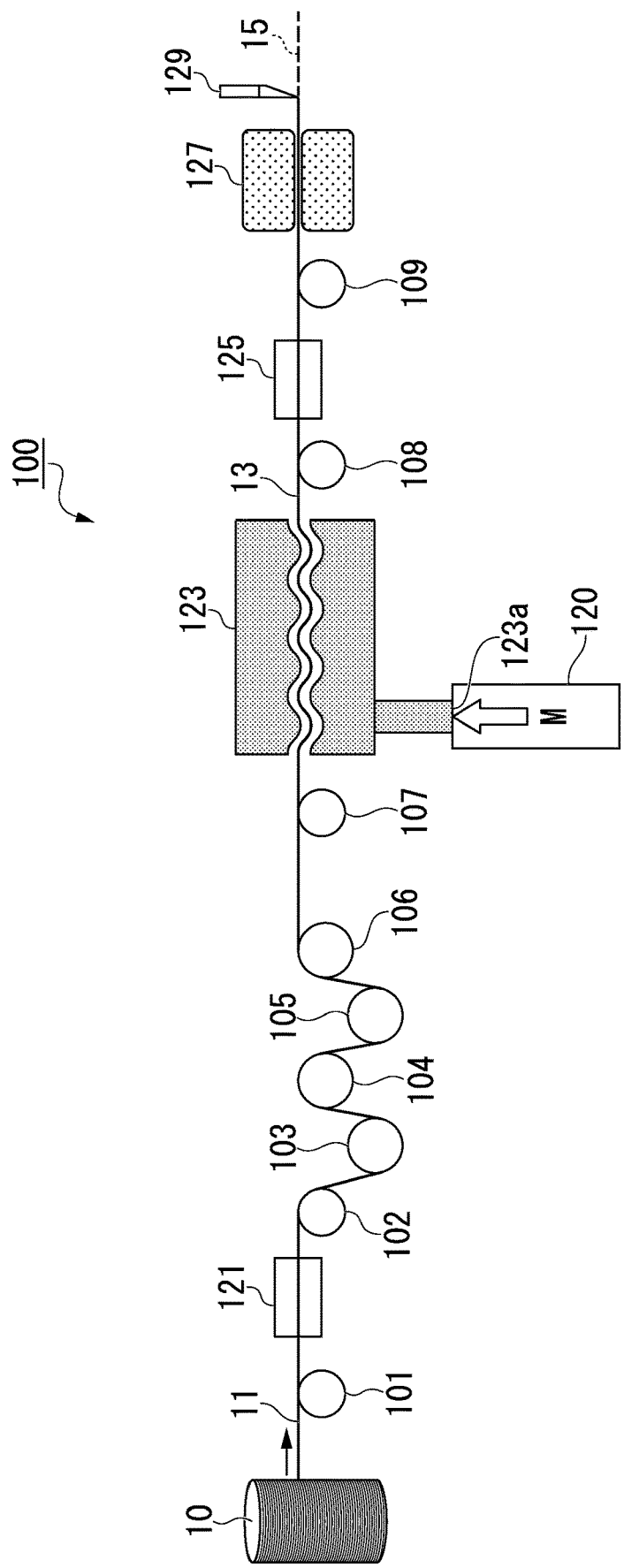

LIQUID CRYSTAL POLYESTER RESIN COMPOSITION, METHOD FOR PRODUCING SAME AND MOLDED BODY OF SAME

CROSS REFERENCE TO RELATED APPLICATIONS

This application is the U.S. National Phase under 35 U.S.C. § 371 of International Application No. PCT/JP2020/029748, filed on Aug. 4, 2020, which claims the benefit of Japanese Application No. 2019-148163, filed on Aug. 9, 2019, the entire contents of each are hereby incorporated by reference.

TECHNICAL FIELD

The present invention relates to a liquid crystal polyester resin composition, a preparation method thereof, and a molded body prepared using the liquid crystal polyester resin composition.

BACKGROUND OF THE INVENTION

It is known that a liquid crystal polyester has a high fluidity, heat resistance and dimensional accuracy. A liquid crystal polyester is rarely used alone, and is used in a liquid crystal polyester resin compositions containing a filler in order to satisfy required characteristics (such as bending characteristics and impact resistance) in various applications. It is known that a molded body made from such a liquid crystal polyester resin composition is lightweight but has high strength.

In recent years, the weight of parts has been reduced with the aim of improving fuel efficiency in the field of transport equipment such as automobiles and aircraft. In order to reduce the weight of parts, the use of resin materials instead of conventionally-used metallic materials to form each part has been studied. For example, a vehicle that is lighter than a conventional vehicle can be obtained by using a liquid crystal polyester as a molding material of a frame-based member, a suspension-based member, or the like, in an automobile.

However, there has been a problem in that the mechanical properties of a molded body obtained from such a liquid crystal polyester resin composition are inferior to those of a molded body obtained from a metallic material.

A method of mixing fibers as a filler with a thermoplastic resin has been proposed to improve the strength of a molding material such as a thermoplastic resin composition (see, for example, Patent Document 1).

DOCUMENTS OF RELATED ART

Patent Documents

Patent Document 1: Japanese Unexamined Patent Application Publication No. Hei 10-77350

SUMMARY OF THE INVENTION

Problems to be Solved by the Invention

An additional decrease in the weight is required in the formation of a molded body which accounts for a large proportion of vehicle weight, such as a frame-based member or a suspension-based member of an automobile. However, securing the strength of a molded body accompanying the additional decrease in the weight of the molded body has become a problem.

The conventional method of simply mixing fibers as a filler with a liquid crystal polyester cannot impart the required strength to a molded body.

The present invention has been made in view of such circumstances, and aims to provide a liquid crystal polyester resin composition which can further enhance the strength of a molded body, a preparation method thereof, and a molded body prepared using the liquid crystal polyester resin composition.

Means to Solve the Problems

In order to solve the above-mentioned problems, the present invention adopts the following constitution.

One aspect of the present invention is a liquid crystal polyester resin composition, containing: a liquid crystal polyester resin; and sizing-agent-coated carbon fibers, wherein the amount of the sizing-agent-coated carbon fibers relative to 100 parts by mass of the liquid crystal polyester resin is 5 parts by mass to 120 parts by mass, the adhesion amount of the sizing-agent to the carbon fibers in the sizing-agent-coated carbon fibers relative to 100 parts by mass of the carbon fibers is 0.1 parts by mass to 1.2 parts by mass, and when the sizing-agent-coated carbon fibers are heated in air from 25° C. to 400° C. at a temperature-increase rate of 50° C./min, the mass loss rate thereof within the range of 300° C. to 400° C. is less than 0.8% by mass.

In the liquid crystal polyester resin composition of an aspect of the present invention, the incipient fluidization temperature of the liquid crystal polyester resin is preferably 280° C. or more.

It is preferable that the liquid crystal polyester resin composition of one aspect of the present invention be a pellet in which the sizing-agent-coated carbon fibers are hardened with the liquid crystal polyester resin, and the carbon fibers be arranged to be substantially parallel to the longitudinal direction of the pellet and have a length substantially identical to that of the pellet.

Although examples of the shape of the pellet include a columnar shape, a disk shape, an elliptical columnar shape, an elliptical disk shape, a Go stone shape, a spherical shape, and an indefinite shape, the shape is not limited to these. A cylindrical shape is more preferable from the viewpoint of productivity and handleability at the time of molding.

In the liquid crystal polyester resin composition of one aspect of the present invention, the length of the pellet is preferably 3 mm to 50 mm.

The term "length of the pellet" refers to the length of the pellet in the longitudinal direction thereof.

In addition, one aspect of the present invention is a molded body prepared using the above-mentioned liquid crystal polyester resin composition.

In addition, one aspect of the present invention is a preparation method of the liquid crystal polyester resin composition, the preparation method including a step of mixing a liquid crystal polyester resin and sizing-agent-coated carbon fibers, wherein the formulation amount of the sizing-agent-coated carbon fibers relative to 100 parts by mass of the liquid crystal polyester resin is 5 parts by mass to 120 parts by mass, the adhesion amount of the sizing-agent to the carbon fibers in the sizing-agent-coated carbon fibers relative to 100 parts by mass of the carbon fibers is 0.1 parts by mass to 1.2 parts by mass, and when the sizing-agent-coated carbon fibers are heated in air from 25° C. to 400° C. at a temperature-increase rate of 50° C./min, the mass loss rate thereof within the range of 300° C. to 400° C. is less than 0.8% by mass.

The preparation method of the liquid crystal polyester resin composition of one aspect of the present invention may be a method of obtaining a pellet in which the sizing-agent-coated carbon fibers are hardened with the liquid crystal polyester resin, the method including: a step of obtaining a resin structure in which the carbon fibers are arranged to be substantially parallel to the longitudinal direction of a liquid crystal polyester resin layer by immersing a carbon fiber bundle in which a plurality of single fibers is sized with a sizing-agent with the liquid crystal polyester resin while reeling out the carbon fiber bundle; and a step of obtaining a pellet having a length substantially identical to that of the carbon fibers arranged in the liquid crystal polyester resin layer by cutting the resin structure to a predetermined length in the longitudinal direction thereof.

Effects of the Invention

According to one aspect of the present invention, it is possible to provide a liquid crystal polyester resin composition capable of further increasing the strength of a molded body and a preparation method thereof.

Furthermore, according to one aspect of the present invention, it is possible to provide a molded body having further enhanced strength using the liquid crystal polyester resin composition.

BRIEF DESCRIPTION OF DRAWINGS

FIG. 1 is a schematic diagram showing an aspect of a preparation device of a liquid crystal polyester resin composition.

EMBODIMENTS FOR CARRYING OUT THE INVENTION (Liquid Crystal Polyester Resin Composition)

A liquid crystal polyester resin composition of the present embodiment includes: a liquid crystal polyester resin; and sizing-agent-coated carbon fibers.

In the present specification, a mixture obtained by mixing a liquid crystal polyester resin and sizing-agent-coated carbon fibers is referred to as a "liquid crystal polyester resin composition". In addition, a material obtained by pelletizing the resultant mixture to be used to prepare a molded body is also referred to as a "liquid crystal polyester resin composition".

The liquid crystal polyester resin composition of the present embodiment is preferably used as a material of the below-mentioned molded body.

<Liquid Crystal Polyester Resin>

The liquid crystal polyester resin used in the present embodiment is a liquid crystal polyester that exhibits liquid crystallinity in a molten state and is melted preferably at a temperature of 450° C. or less.

The liquid crystal polyester resin used in the present embodiment may be a liquid crystal polyester amide, a liquid crystal polyester ether, a liquid crystal polyester carbonate, or a liquid crystal polyester imide. It is preferable that the liquid crystal polyester resin used in the present embodiment be a wholly aromatic liquid crystal polyester formed using only aromatic compounds as raw material monomers.

Typical examples of the liquid crystal polyester resin used in the present embodiment include: ones obtained by polymerization (polycondensation) of an aromatic hydroxycarboxylic acid, an aromatic dicarboxylic acid, and at least one compound selected from the group consisting of aromatic diols, aromatic hydroxylamines, and aromatic diamines; ones obtained by polymerization of plural aromatic hydroxycarboxylic acids; ones obtained by polymerization of an aromatic dicarboxylic acid and at least one compound selected from the group consisting of aromatic diols, aromatic hydroxyamines and aromatic diamines; and ones obtained by polymerization of a polyester such as polyethylene terephthalate with an aromatic hydroxycarboxylic acid. The aromatic hydroxycarboxylic acids, aromatic dicarboxylic acids, aromatic diols, aromatic hydroxyamines and aromatic diamines may be each independently replaced with polymerizable derivatives thereof in part or in the entirety thereof.

Examples of the polymerizable derivative of the compound having a carboxyl group such as an aromatic hydroxycarboxylic acid or an aromatic dicarboxylic acid include: ones (esters) obtained by replacing a carboxyl group with an alkoxycarbonyl group or an aryloxycarbonyl group; ones (acid halides) obtained by replacing a carboxyl group with a haloformyl group, and ones (acid anhydrides) obtained by replacing a carboxyl group with an acyloxycarbonyl group. Examples of the polymerizable derivative of the compound having a hydroxyl group such as an aromatic hydroxycarboxylic acid, an aromatic diol or an aromatic hydroxylamine include ones (acylated products) obtained by acylating a hydroxyl group to an acyloxy group. Examples of the polymerizable derivative of the compound having an amino group such as an aromatic hydroxylamine and an aromatic diamine include ones (acylated products) obtained by acylating an amino group to an acylamino group.

The liquid crystal polyester resin used in the present embodiment preferably has a repeating unit of the following formula (1) (hereinafter, may be abbreviated as "repeating unit (1)"), and more preferably has the repeating unit (1), a repeating unit of the following formula (2) (hereinafter, may be abbreviated as "repeating unit (2)") and a repeating unit of the following formula (3) (hereinafter, may be abbreviated as "repeating unit (3)").

$$—O—Ar^1—CO— \quad (1)$$

$$—CO—Ar^2—CO— \quad (2)$$

$$—X—Ar^3—Y— \quad (3)$$

($Ar^1$ is a phenylene group, a naphthylene group or a biphenylene group. Are and $Ar^3$ are each independently a phenylene group, a naphthylene group, a biphenylene group or a group of formula (4). X and Y are each independently an oxygen atom or an imino group (—NH—). Any hydrogen atoms in $Ar^1$, $Ar^2$ or $Ar^3$ may be each independently replaced with a halogen atom, an alkyl group or an aryl group.)

$$—Ar^4—Z—Ar^5— \quad (4)$$

($Ar^4$ and $Ar^5$ are each independently a phenylene group or a naphthylene group. Z is an oxygen atom, a sulfur atom, a carbonyl group, a sulfonyl group or an alkylidene group.)

Examples of the halogen atom include a fluorine atom, a chlorine atom, a bromine atom and an iodine atom. Examples of the alkyl group include a methyl group, an ethyl group, a n-propyl group, an isopropyl group, a n-butyl group, an isobutyl group, a s-butyl group, a t-butyl group, a n-hexyl group, a 2-ethylhexyl group, a n-octyl group and a n-decyl group, and the carbon number thereof is preferably 1 to 10. Examples of the aryl group include a phenyl group, an o-tolyl group, a m-tolyl group, a p-tolyl group, a 1-naphthyl group and a 2-naphthyl group, and the carbon number thereof is preferably 6 to 20. In the case where the hydrogen atoms are replaced with these groups, it is preferable that the number thereof per group of $Ar^1$, $Ar^2$ or $Ar^3$ be each independently 2 or less, and more preferably 1 or less.

Examples of the alkylidene group include a methylene group, an ethylidene group, an isopropylidene group, a n-butylidene group and a 2-ethylhexylidene group, and the carbon number thereof is preferably 1 to 10.

The repeating unit (1) is a repeating unit derived from a predetermined aromatic hydroxycarboxylic acid. The repeating unit (1) is preferably a repeating unit (1) in which $Ar^1$ is a 1,4-phenylene group (a repeating unit derived from a p-hydroxybenzoic acid) or a repeating unit (1) in which $Ar^1$ is a 2,6-naphthylene group (a repeating unit derived from a 6-hydroxy-2-naphthoic acid).

In the present specification, the term "derived from" means that the chemical structure of a functional group contributing to polymerization of raw material monomers changes due to the polymerization, and other structural change does not occur.

The repeating unit (2) is a repeating unit derived from a predetermined aromatic dicarboxylic acid. The repeating unit (2) is preferably a repeating unit (2) in which $Ar^2$ is a 1,4-phenylene group (a repeating unit derived from a terephthalic acid), a repeating unit (2) in which $Ar^2$ is a 1,3-phenylene group (a repeating unit derived from an isophthalic acid), a repeating unit (2) in which $Ar^2$ is a 2,6-naphthylene group (a repeating unit derived from a 2,6-naphthalenedicarboxylic acid), or a repeating unit (2) in which $Ar^2$ is a diphenyl ether-4,4'-diyl group (a repeating unit derived from a diphenyl ether-4,4'-dicarboxylic acid).

The repeating unit (3) is a repeating unit derived from a predetermined aromatic diol, aromatic hydroxylamine or aromatic diamine. The repeating unit (3) is preferably a repeating unit (3) in which $Ar^3$ is a 1,4-phenylene group (a repeating unit derived from a hydroquinone, a p-aminophenol or a p-phenylenediamine), or a repeating unit (3) in which $Ar^3$ is a 4,4'-biphenylene group (a repeating unit derived from a 4,4'-dihydroxybiphenyl, a 4-amino-4'-hydroxybiphenyl or a 4,4'-diaminobiphenyl).

The amount of the repeating unit (1) relative to the total amount of all repeating units (sum of each amount (mol) of substance of each repeating unit, obtained by dividing each mass of each repeating unit constituting the liquid crystal polyester resin by each formula weight of each repeating unit) is preferably 30% by mol or more, more preferably 30% by mol to 80% by mol, even more preferably 40% by mol to 70% by mol, and particularly preferably 45% by mol to 65% by mol.

The amount of the repeating unit (2) relative to the total amount of all repeating units is preferably 35% by mol or less, more preferably 10% by mol to 35% by mol, even more preferably 15% by mol to 30% by mol, and particularly preferably 17.5% by mol to 27.5% by mol.

The amount of the repeating unit (3) relative to the total amount of all repeating units is preferably 35% by mol or less, more preferably 10% by mol to 35% by mol, even more preferably 15% by mol to 30% by mol, and particularly preferably 17.5% by mol to 27.5% by mol.

Note that the total amount of the repeating units (1), (2) and (3) does not exceed 100% by mol.

The larger the amount of the repeating unit (1), the easier the melt fluidity, the heat resistance, and the strength/rigidity are improved. However, an excessive amount of the repeating unit (1) readily increases the melt temperature, the melt viscosity, and the temperature required to conduct molding.

The ratio of the amount of the repeating unit (2) to the amount of the repeating unit (3), indicated by "the amount of the repeating unit (2)"/"the amount of the repeating unit (3)" (mol/mol), is preferably 0.9/1 to 1/0.9, more preferably 0.95/1 to 1/0.95, and even more preferably 0.98/1 to 1/0.98.

The liquid crystal polyester resin used in the present embodiment may contain at least two of each of the repeating units (1) to (3) independently. Although the liquid crystal polyester may contain repeating units other than the repeating units (1) to (3), the amount thereof relative to the total amount of all repeating units is preferably 10% by mol or less, and more preferably 5% by mol or less.

It is preferable that the liquid crystal polyester resin used in the present embodiment include a repeating unit (3) in which both X and Y are oxygen atoms, namely a repeating unit derived from a predetermined aromatic diol, and more preferably include only a repeating unit (3) in which both X and Y are oxygen atoms as the repeating unit (3), from the viewpoint that the melt viscosity is readily decreased.

It is preferable that the liquid crystal polyester resin used in the present embodiment be produced by melt-polymerizing raw material monomers corresponding to the repeating units constituting the liquid crystal polyester, followed by subjecting the resultant polymer (hereinafter, may be referred to as "prepolymer") to solid phase polymerization. Thus, it becomes possible to produce the liquid crystal polyester resin having a high heat resistance, a high strength/rigidity, and a high molecular weight with good handleability.

The melt polymerization may be carried out in the presence of a catalyst. Examples of the catalyst include: metal compounds such as magnesium acetate, stannous acetate, tetrabutyl titanate, lead acetate, sodium acetate, potassium acetate and antimony trioxide; and nitrogen-containing heterocyclic compounds such as 4-(dimethylamino)pyridine and 1-methylimidazole. Among them, nitrogen-containing heterocyclic compounds are preferably used.

The incipient fluidization temperature of the liquid crystal polyester resin used in the present embodiment is preferably 280° C. or more, more preferably 280° C. to 400° C., and even more preferably 280° C. to 380° C.

The higher the incipient fluidization temperature of the liquid crystal polyester resin used in the present embodiment, the stronger the tendency of the liquid crystal polyester resin to have improved heat resistance and strength. In contrast, in the case where the incipient fluidization temperature of the liquid crystal polyester resin exceeds 400° C., the melt temperature and the melt viscosity of the liquid crystal polyester resin tends to become high. Thus, the temperature required to conduct molding of the liquid crystal polyester resin tends to become high.

In the liquid crystal polyester resin composition of the present embodiment, the amount of the liquid crystal polyester resin relative to the total mass of the liquid crystal polyester resin composition is preferably 30% by mass to 95% by mass, more preferably 40% by mass to 90% by mass, and even more preferably 50% by mass to 90% by mass.

In the present specification, the incipient fluidization temperature of the liquid crystal polyester is also referred to as flow temperature or fluidizing temperature, and is a temperature that gives an indication of the molecular weight of the liquid crystal polyester resin (see "Liquid Crystal Polymers—Synthesis, Molding, and Applications", edited by Naoyuki Koide, CMC Publishing Co., Ltd., Jun. 5, 1987, p 95).

The incipient fluidization temperature is a temperature at which the viscosity reaches 4800 Pas (48000 poises) as measured by melting the liquid crystal polyester resin while increasing the temperature thereof at a rate of 4° C./min under a load of 9.8 MPa (100 kg/cm') to extrude the melted liquid crystal polyester resin from a nozzle having an inner diameter of 1 mm and a length of 10 mm, using a capillary rheometer.

<Sizing-Agent-Coated Carbon Fibers>

The sizing-agent-coated carbon fibers used in the present embodiment are obtained by adding a sizing agent to general carbon fibers obtained by calcining a precursor. For example, a precursor is subjected to flame-retardant treatment under an oxidizing atmosphere, followed by calcining the resultant flame-retardant fibers approximately at 800° C. to 2000° C. under an inert gas atmosphere. Furthermore, the resultant is calcined at a higher temperature, as needed, under an inert gas atmosphere. A sizing agent is added to the surface of the calcined fibers, and the resultant is preferably used.

Although the type of carbon fibers in the present embodiment is not particularly limited, examples thereof include polyacrylonitrile-based (hereinafter, may be referred to as "PAN-based"), petroleum/coal pitch-based (hereinafter, may be referred to as "pitch-based"), rayon-based, and lignin-based carbon fibers.

Examples of the PAN-based carbon fibers include "TORAYCA (registered trademark)" manufactured by TORAY INDUSTRIES, INC., "PYROFIL (registered trademark)" manufactured by Mitsubishi Chemical Corporation, and "Tenax (registered trademark)" manufactured by TEIJIN LIMITED.

Examples of the pitch-based carbon fibers include "DIALEAD (registered trademark)" manufactured by Mitsubishi Chemical Corporation, "DONACARBO (registered trademark)" manufactured by Osaka Gas Chemical Co., Ltd., and "GRANOC (registered trademark)" manufactured by Nippon Graphite Fiber Co., Ltd.

Although the sizing-agent-coated carbon fibers in the present embodiment are not particularly limited provided that a sizing-agent is added to the surface of carbon fibers, examples thereof include: a carbon fiber roving in which a carbon fiber bundle in which a plurality of single fibers is sized with a sizing-agent is reeled into a roll; chopped carbon fibers obtained by cutting a carbon fiber bundle sized with a sizing-agent to a length of approximately 3 mm to 15 mm; and milled carbon fibers obtained by pulverizing the chopped carbon fibers with a pulverizer such as a ball mill to untruss the fiber bundle and shorten the fiber length to 20 μm to 400 μm. Among these, a carbon fiber roving or chopped carbon fibers are preferably used from the viewpoint of handleability during preparation, and a carbon fiber roving is more preferably used because the strength of a molded body is easily enhanced.

Although the number-average fiber diameter of the carbon fibers in the present embodiment is not particularly limited, the number-average fiber diameter of the carbon fibers is preferably 1 μm to 10 μm, and more preferably 5 μm to 8 μm. The number-average value of values obtained by observing carbon fibers with a scanning electron microscope (at a magnification of ×1000), randomly selecting 50 carbon fibers, and then measuring the fiber diameter thereof is adopted as the number-average fiber diameter of the carbon fibers.

In the case where the number-average fiber diameter of the carbon fibers is the lower limit or more of the above-mentioned preferable range, the carbon fibers are easily dispersed in the liquid crystal polyester resin, and readily handled when the liquid crystal polyester resin composition is prepared. In contrast, in the case where the number-average fiber diameter of the carbon fibers is the upper limit or less of the above-mentioned preferable range, the liquid crystal polyester resin is efficiently reinforced with the carbon fibers. Therefore, excellent flexural strength can be imparted to a molded body formed by molding the liquid crystal polyester resin composition of the present embodiment.

In the case where the sizing-agent-coated carbon fibers of the present embodiment are a carbon fiber bundle in which a plurality of single fibers is sized with a sizing-agent, such as a carbon fiber roving or a chopped carbon fiber, although the number of fibers sized in the carbon fiber bundle is not particularly limited, the number is preferably 3000 or more, and more preferably 12000 or more. In the case where the number of fibers sized in the carbon fiber bundle is 3000 or more, the carbon fibers are readily handled when the liquid crystal polyester resin composition is prepared. The number of fibers sized in the carbon fiber bundle is preferably 60000 or less, and more preferably 18000 or less. In the case where the number of fibers sized in the carbon fiber bundle is 60000 or less, the carbon fibers are readily dispersed in the liquid crystal polyester resin, and the amount of the carbon fibers in the liquid crystal polyester resin composition is readily adjusted.

Although the type of the sizing agent in the sizing-agent-coated carbon fibers used in the present embodiment is not particularly limited, examples thereof include nylon-based polymers, polyether-based polymers, epoxy-based polymers, ester-based polymers, urethane-based polymers, mixed polymers thereof, and modified polymers thereof.

Among these, nylon-based polymers, polyether-based polymers, epoxy-based polymers, or various modified polymers thereof are preferable, nylon-based polymers, polyether-based polymers, epoxy-based polymers, or modified epoxy-based polymers are more preferable, and nylon-based polymers, polyether-based polymers, or epoxy-based polymers are even more preferable as sizing-agents, since the mass loss rate of the sizing-agent-coated carbon fibers is readily lowered.

The adhesion amount of the sizing-agent to the carbon fibers in the sizing-agent-coated carbon fibers relative to 100 parts by mass of the carbon fibers is 0.1 parts by mass to 1.2 parts by mass, preferably 0.2 parts by mass to 1.0 part by mass, and more preferably 0.2 parts by mass to 0.8 parts by mass.

In the case where the adhesion amount of the sizing-agent is the lower limit or more of the above-mentioned preferable range, the carbon fibers are easily handled when the liquid crystal polyester resin composition is prepared. In contrast, in the case where the adhesion amount of the sizing-agent is the upper limit or less of the above-mentioned preferable range, the carbon fibers are easily opened.

The adhesion amount of the sizing-agent in the sizing-agent-coated carbon fibers can be measured as described below.

The sizing-agent-coated carbon fibers are dried at 110° C. for 1 hour and cooled to 25° C. to be made in an absolutely dry state, followed by precisely weighing the mass (W1 (g)) thereof. 50 mL of 95% concentrated sulfuric acid is added to the sizing-agent-coated carbon fibers in an absolutely dry state, and the mixture is left at 25° C. for 2 hours to decompose a sizing-agent. Then, carbon fibers are filtered using a glass filter having a mass of W2 (g) that is precisely weighed after being dried in advance at 110° C. for 1 hour, and then washed with approximately 1000 mL of water, followed by drying the glass filter containing the carbon fibers at 110° C. for 1 hour, cooling to 25° C., and then precisely weighing the mass (W3 (g)) of the glass filter containing the carbon fibers. Then, the adhesion amount of the sizing-agent is determined in accordance with the following equation.

Adhesion amount of sizing-agent(% by mass)=($W1-W3+W2$)×100/$W1$

The resultant adhesion amount of the sizing-agent is used to determine the ratio (parts by mass) thereof relative to 100 parts by mass of the carbon fibers as the adhesion amount of the sizing-agent to the carbon fibers.

Adhesion amount of sizing-agent(parts by mass) relative to 100 parts by mass of carbon fibers= ($W1-W3+W2$)×100/($W3-W2$)

In the sizing-agent-coated carbon fibers used in the present embodiment, the mass loss rate thereof within the range of 300° C. to 400° C. when the sizing-agent-coated carbon fibers are heated in air from 25° C. to 400° C. at a temperature-increase rate of 50° C./min is less than 0.8% by mass, preferably 0.7% by mass or less, more preferably 0.6% by mass or less, even more preferably 0.5% by mass or less, and particularly preferably 0.4% by mass or less. The lower mass loss rate is preferable because it becomes easier to maintain the strength of a molded body. In contrast, the lower limit of the mass loss rate is, for example, 0.1% by mass or more.

The mass loss rate of the sizing-agent-coated carbon fibers can be measured by conducting thermogravimetric analysis (TGA). When a sizing-agent-coated carbon fiber bundle is heated in air from 25° C. to 400° C. at a temperature-increase rate of 50° C./min, the mass loss rate (% by mass) thereof within the range of 300° C. to 400° C. is determined using the mass $W_{300}$ at 300° C. and the mass $W_{400}$ at 400° C. in accordance with the following equation.

Mass loss rate(% by mass)=($W_{300}-W_{400}$)/$W_{300}$×100

In the liquid crystal polyester resin composition of the present embodiment, the amount of the sizing-agent-coated carbon fibers relative to 100 parts by mass of the liquid crystal polyester resin is 5 parts by mass to 120 parts by mass, preferably 5 parts by mass to 100 parts by mass, and more preferably 10 parts by mass to 80 parts by mass.

In the case where the amount of the sizing-agent-coated carbon fibers is the lower limit or more of the above-mentioned preferable range, the liquid crystal polyester resin is efficiently reinforced with the carbon fibers. In contrast, in the case where the amount of the sizing-agent-coated carbon fibers is the upper limit or less of the above-mentioned preferable range, the carbon fibers are easily dispersed in the liquid crystal polyester resin.

<Other Components>

The liquid crystal polyester resin composition of the present embodiment may include, in addition to the liquid crystal polyester resin and the sizing-agent-coated carbon fibers, at least one of other components such as fillers, additives, and resins other than the liquid crystal polyester resin, as needed.

The fillers may be fiber-shaped fillers, plate-shaped fillers, spherically-shaped fillers, or other granular fillers. In addition, the fillers may be inorganic fillers or organic fillers.

Examples of the fiber-shaped inorganic fillers include glass fibers; ceramic fibers such as silica fibers, alumina fibers, and silica alumina fibers; metal fibers such as stainless steel fibers; whiskers such as potassium titanate whiskers, barium titanate whiskers, wollastonite whiskers, aluminum borate whiskers, silicon nitride whiskers, and silicon carbide whiskers.

Examples of the fiber-shaped organic fillers include polyester fibers and aramid fibers.

Examples of the plate-shaped inorganic fillers include talc, mica, graphite, wollastonite, glass flake, barium sulfate, and calcium carbonate. Mica may be muscovite, phlogopite, fluorophlogopite, or tetrasilicic mica.

Examples of the granular inorganic fillers include silica, alumina, titanium oxide, glass beads, glass balloon, boron nitride, silicon carbide, and calcium carbonate.

Examples of the additives include antioxidants, thermal stabilizers, ultraviolet absorbers, antistatic agents, surfactants, flame retardants, and colorants.

Examples of the resin other than the liquid crystal polyester resin include: thermoplastic resins other than liquid crystal polyester resins, such as polypropylenes, polyamides, polyesters other than liquid crystal polyester resins, polysulfones, polyphenylenesulfides, polyetherketones, polycarbonates, polyphenylene ethers, and polyetherimides; and thermosetting resins such as phenol resins, epoxy resins, polyimide resins, and cyanate resins.

The liquid crystal polyester resin composition of the present invention has the following aspects.

(1) A liquid crystal polyester resin composition, including: a liquid crystal polyester resin; and sizing-agent-coated carbon fibers, wherein the amount of the sizing-agent-coated carbon fibers relative to 100 parts by mass of the liquid crystal polyester resin is 5 parts by mass to 120 parts by mass, the adhesion amount of the sizing-agent to the carbon fibers in the sizing-agent-coated carbon fibers relative to 100 parts by mass of the carbon fibers is 0.1 parts by mass to 1.2 parts by mass, and when the sizing-agent-coated carbon fibers are heated in air from 25° C. to 400° C. at a temperature-increase rate of 50° C./min, the mass loss rate thereof within the range of 300° C. to 400° C. is less than 0.8% by mass.

(2) A liquid crystal polyester resin composition, including: a liquid crystal polyester resin; and sizing-agent-coated carbon fibers, wherein the amount of the sizing-agent-coated carbon fibers relative to 100 parts by mass of the liquid crystal polyester resin is 5 parts by mass to 100 parts by mass, the adhesion amount of the sizing-agent to the carbon fibers in the sizing-agent-coated carbon fibers relative to 100 parts by mass of the carbon fibers is 0.2 parts by mass to 1.0 part by mass, and when the sizing-agent-coated carbon fibers are heated in air from 25° C. to 400° C. at a temperature-increase rate of 50° C./min, the mass loss rate thereof within the range of 300° C. to 400° C. is 0.1% by mass to 0.7% by mass.

(3) A liquid crystal polyester resin composition, including: a liquid crystal polyester resin; and sizing-agent-coated carbon fibers, wherein the amount of the sizing-agent-coated carbon fibers relative to 100 parts by mass of the liquid crystal polyester resin is 10 parts by mass to 80 parts by mass, the adhesion amount of the sizing-agent to the carbon fibers in the sizing-agent-coated carbon fibers relative to 100 parts by mass of the carbon fibers is 0.2 parts by mass to 0.8 parts by mass, and when the sizing-agent-coated carbon fibers are heated in air from 25° C. to 400° C. at a temperature-increase rate of 50° C./min, the mass loss rate thereof within the range of 300° C. to 400° C. is 0.1% by mass to 0.6% by mass.

(4) A liquid crystal polyester resin composition, including: a liquid crystal polyester resin; and sizing-agent-coated carbon fibers, wherein the amount of the sizing-agent-coated carbon fibers relative to 100 parts by mass of the liquid crystal polyester resin is 18 parts by mass to 67 parts by mass, the adhesion amount of the sizing-agent to the carbon fibers in the sizing-agent-coated carbon fibers relative to 100 parts by mass of the carbon fibers is 0.2 parts by mass to 1.2 parts by mass, and when the sizing-agent-coated carbon fibers are heated in air from 25° C. to 400° C. at a temperature-increase rate of 50° C./min, the mass loss rate thereof within the range of 300° C. to 400° C. is 0.24% by mass to 0.49% by mass.

(5) A liquid crystal polyester resin composition, including: a liquid crystal polyester resin; and sizing-agent-coated carbon fibers, wherein the amount of the sizing-agent-coated carbon fibers relative to 100 parts by mass of the liquid crystal polyester resin is 5 parts by mass to 120 parts by mass, the adhesion amount of the sizing-agent to the carbon fibers in the sizing-agent-coated carbon fibers relative to 100 parts by mass of the carbon fibers is 0.1 parts by mass to 1.2 parts by mass, and when the sizing-agent-coated carbon fibers are heated in air from 25° C. to 400° C. at a temperature-increase rate of 50° C./min, the mass loss rate thereof within the range of 300° C. to 400° C. is less than 0.8% by mass.

(6) A liquid crystal polyester resin composition, including: a liquid crystal polyester resin; and sizing-agent-coated carbon fibers, wherein the amount of the sizing-agent-coated carbon fibers relative to 100 parts by mass of the liquid crystal polyester resin is 5 parts by mass to 100 parts by mass, the adhesion amount of the sizing-agent to the carbon fibers in the sizing-agent-coated carbon fibers relative to 100 parts by mass of the carbon fibers is 0.2 parts by mass to 1.0 part by mass, and when the sizing-agent-coated carbon fibers are heated in air from 25° C. to 400° C. at a temperature-increase rate of 50° C./min, the mass loss rate thereof within the range of 300° C. to 400° C. is 0.1% by mass to 0.7% by mass.

(7) A liquid crystal polyester resin composition, including: a liquid crystal polyester resin; and sizing-agent-coated carbon fibers, wherein the amount of the sizing-agent-coated carbon fibers relative to 100 parts by mass of the liquid crystal polyester resin is 10 parts by mass to 80 parts by mass, the adhesion amount of the sizing-agent to the carbon fibers in the sizing-agent-coated carbon fibers relative to 100 parts by mass of the carbon fibers is 0.2 parts by mass to 0.8 parts by mass, and when the sizing-agent-coated carbon fibers are heated in air from 25° C. to 400° C. at a temperature-increase rate of 50° C./min, the mass loss rate thereof within the range of 300° C. to 400° C. is 0.1% by mass to 0.6% by mass.

(8) A liquid crystal polyester resin composition, including: a liquid crystal polyester resin; and sizing-agent-coated carbon fibers, wherein the amount of the sizing-agent-coated carbon fibers relative to 100 parts by mass of the liquid crystal polyester resin is 18 parts by mass to 67 parts by mass, the adhesion amount of the sizing-agent to the carbon fibers in the sizing-agent-coated carbon fibers relative to 100 parts by mass of the carbon fibers is 0.2 parts by mass to 1.2 parts by mass, and when the sizing-agent-coated carbon fibers are heated in air from 25° C. to 400° C. at a temperature-increase rate of 50° C./min, the mass loss rate thereof within the range of 300° C. to 400° C. is 0.24% by mass to 0.49% by mass.

(9) The liquid crystal polyester resin composition according to any one of (1) to (8) mentioned above, wherein the liquid crystal polyester resin composition is a pellet in which the sizing-agent-coated carbon fibers are hardened with the liquid crystal polyester resin.

(10) The liquid crystal polyester resin composition according to (9) mentioned above, wherein the sizing-agent-coated carbon fibers are arranged to be substantially parallel to the longitudinal direction of the pellet, and have a length substantially identical to the length of the pellet.

(11) The liquid crystal polyester resin composition according to (10) mentioned above, wherein the length of the pellet is 3 mm to 50 mm.

(12) The liquid crystal polyester resin composition according to any one of (1) to (11) mentioned above, wherein the mass loss rate is 0.7% by mass or less, preferably 0.6% by mass or less, more preferably 0.5% by mass or less, and even more preferably 0.4% by mass or less.

(13) The liquid crystal polyester resin composition according to any one of (1) to (12) mentioned above, wherein the incipient fluidization temperature of the liquid crystal polyester resin is 280° C. or more, preferably 280° C. to 400° C., and more preferably 280° C. to 380° C.

(14) The liquid crystal polyester resin composition according to any one of (1) to (13) mentioned above, wherein the amount of the sizing-agent-coated carbon fibers relative to 100 parts by mass of the liquid crystal polyester resin is 5 parts by mass to 100 parts by mass, preferably 10 parts by mass to 80 parts by mass, and more preferably 18 parts by mass to 67 parts by mass.

(15) The liquid crystal polyester resin composition according to any one of (1) to (14) mentioned above, wherein the adhesion amount of the sizing-agent to the carbon fibers in the sizing-agent-coated carbon fibers relative to 100 parts by mass of the carbon fibers is 0.2 parts by mass to 1.2 parts by mass, preferably 0.2 parts by mass to 1.0 part by mass, and more preferably 0.2 parts by mass to 0.8 parts by mass.

(16) The liquid crystal polyester resin composition according to any one of (1) to (15) mentioned above, wherein the liquid crystal polyester resin includes a repeating unit of the following formula (1), (2) or (3), the amount of the repeating unit of the following formula (1) relative to the total amount of the repeating units of the following formulae (1), (2) and (3) is 30% by mol to 100% by mol, preferably 30% by mol to 80% by mol, more preferably 40% by mol to 70% by mol, and even more preferably 45% by mol to 65% by mol, the amount of the repeating unit of the following formula (2) relative to the total amount of the repeating units of the following formulae (1), (2) and (3) is 0% by mol to 35% by mol, preferably 10% by mol to 35% by mol, more preferably 15% by mol to 30% by mol, and even more preferably 17.5% by mol to 27.5% by mol, and the amount of the repeating unit of the following formula (3) relative to the total amount of the repeating units of the following formulae (1), (2) and (3) is 0% by mol to 35% by mol, preferably 10% by mol to 35% by mol, more preferably 15% by mol to 30% by mol, and even more preferably 17.5% by mol to 27.5% by mol, provided that the total amount of the formulae (1), (2) and (3) does not exceed 100% by mol.

$$—O—Ar^1—CO— \quad (1)$$

$$—CO—Ar^2—CO— \quad (2)$$

$$—X—Ar^3—Y— \quad (3)$$

(Ar¹ is a phenylene group, a naphthylene group or a biphenylene group. Ar² and Ar³ are each independently a phenylene group, a naphthylene group, a biphenylene group or a group of the following formula (4). X and Y are each independently an oxygen atom or an imino group (—NH—). Any hydrogen atoms in the group of Ar¹, Ar² or Ar³ may be each independently replaced with a halogen atom, an alkyl group or an aryl group.)

  (4)

(Ar⁴ and Ar⁵ are each independently a phenylene group or a naphthylene group. Z is an oxygen atom, a sulfur atom, a carbonyl group, a sulfonyl group or an alkylidene group.)

(17) The liquid crystal polyester resin composition according to (16) mentioned above, wherein the amount of the repeating unit of the formula (1) relative to the total amount of the repeating units of the formulae (1), (2) and (3) is 30% by mol to 80% by mol, the amount of the repeating unit of the formula (2) relative to the total amount of the repeating units of the formulae (1), (2) and (3) is 10% by mol to 35% by mol, and the amount of the repeating unit of the formula (3) relative to the total amount of the repeating units of the formulae (1), (2) and (3) is 10% by mol to 35% by mol.

(18) The liquid crystal polyester resin composition according to any one of (1) to (17) mentioned above, wherein the number-average fiber diameter of the carbon fibers is 1 μm to 10 μm, and preferably 5 μm to 8 μm.

(19) The liquid crystal polyester resin composition according to any one of (1) to (18) mentioned above, wherein the liquid crystal polyester resin composition is a pellet in which the sizing-agent-coated carbon fibers are hardened with the liquid crystal polyester resin.

(Preparation Method of the Liquid Crystal Polyester Resin Composition)

The liquid crystal polyester resin composition of the present embodiment may be prepared by mixing 100 parts by mass of the above-mentioned liquid crystal polyester resin, 5 parts by mass to 120 parts by mass of the above-mentioned sizing-agent-coated carbon fibers, and, as needed, other components.

For example, a pellet in which the sizing-agent-coated carbon fibers are hardened with the liquid crystal polyester resin may be obtained by melt-kneading the liquid crystal polyester resin, and, as needed, other components, followed by immersing the sizing-agent-coated carbon fibers with the resultant melt-kneaded product to conduct pelletization. It is preferable that the carbon fibers be sized with a sizing-agent to form a carbon fiber bundle, because raveling of the carbon fiber bundle is prevented when the carbon fiber bundle is reeled out from a carbon fiber roving to immerse the sizing-agent-coated carbon fibers with the liquid crystal polyester, thereby realizing favorable handleability.

FIG. 1 indicates one embodiment of a preparation device of the liquid crystal polyester resin composition.

In the present embodiment shown in FIG. 1, the case in which pellets 15 formed from the liquid crystal polyester resin composition are obtained using a carbon fiber roving 10 in which the sizing-agent-coated carbon fiber bundle 11 formed by sizing a plurality of carbon fibers with a sizing-agent is reeled into a roll will be explained.

As shown in FIG. 1, a preparation device 100 includes a preheating unit 121, an impregnation unit 123, a cooling unit 125, a taking-up unit 127, a cutting unit 129, and transfer rolls 101 to 109. In the preparation device 100 shown in FIG. 1, an extruder 120 is connected to the impregnation unit 123.

FIG. 1 shows the process in which the sizing-agent-coated carbon fiber bundle 11 is continuously reeled out from the carbon fiber roving 10. In the present embodiment, the pellets formed from the liquid crystal polyester resin composition are prepared while conveying the sizing-agent-coated carbon fiber bundle 11 reeled out from the carbon fiber roving 10 in the longitudinal direction by the transfer rolls 101 to 109.

Although the fineness of the carbon fiber roving 10 used to prepare the liquid crystal polyester resin composition of the present embodiment is not particularly limited, the fineness is preferably 200 g/1000 m or more, and more preferably 800 g/1000 m or more. In the case where the fineness of the carbon fiber roving 10 is 200 g/1000 m or more, the carbon fiber roving 10 can be readily handled in the preparation method of the liquid crystal polyester resin composition.

The fineness of the carbon fiber roving 10 is preferably 3750 g/1000 m or less, and more preferably 3200 g/1000 m or less. In the case where the fineness of the carbon fiber roving 10 is 3750 g/1000 m or less, the carbon fibers are readily dispersed in the liquid crystal polyester resin and are readily handled during the preparation of the liquid crystal polyester resin composition.

Namely, the fineness of the carbon fiber roving 10 is preferably 200 g/1000 m to 3750 g/1000 m, and more preferably 800 g/1000 m to 3200 g/1000 m.

In the preheating unit 121, the sizing-agent-coated carbon fiber bundle 11 reeled out from the carbon fiber roving 10 is heated and dried. Although the heating temperature therein is not particularly limited, the heating temperature is, for example, 50° C. to 250° C.

Although the heating time in the preheating unit 121 is not particularly limited, the heating time is, for example, 3 seconds to 30 seconds.

In the impregnation unit 123, the sizing-agent-coated carbon fiber bundle 11 is impregnated with a molding material M other than the sizing-agent-coated carbon fiber bundle 11 (the molding material M including the liquid crystal polyester resin and, as needed, additionally-formulated components).

The sizing-agent-coated carbon fiber bundle 11 may be impregnated with the melt obtained by supplying the molding material M from a supply port 123a into the impregnation unit 123 and then heating the molding material M in the impregnation unit 123, or may be impregnated with the molding material M by supplying the molding material M melt-kneaded by the extruder 120 from the supply port 123a.

In the embodiment shown in FIG. 1, a resin structure 13 in which the carbon fiber bundle is impregnated and coated with the melt is obtained.

The heating temperature in the impregnation unit 123 is appropriately determined depending on the type of liquid crystal polyester resin, and is preferably set to a temperature higher than the incipient fluidization temperature of the used liquid crystal polyester resin by 10° C. to 80° C., and, for example, set to 300° C. to 400° C.

In the impregnation unit 123, 5 parts by mass to 120 parts by mass, preferably 5 parts by mass to 100 parts by mass, and more preferably 10 parts by mass to 80 parts by mass of the sizing-agent-coated carbon fibers are impregnated with 100 parts by mass of the liquid crystal polyester resin, depending on the characteristics required for a molded body. In the case where the formulation amount of the sizing-agent-coated carbon fibers is the lower limit or more of the above-mentioned preferable range, the liquid crystal polyester resin is efficiently reinforced by the carbon fibers. In contrast, when the formulation amount of the sizing-agent-coated carbon fibers is the upper limit or less of the above-mentioned preferable range, it becomes easy to open the carbon fiber bundle and to impregnate the carbon fiber bundle with the liquid crystal polyester resin.

The formulation ratio of the sizing-agent-coated carbon fibers to the liquid crystal polyester resin in the resin structure 13 may be adjusted by changing the nozzle diameter of a die head at an outlet of the impregnation unit 123 relative to the diameter of the sizing-agent-coated carbon fiber bundle 11.

In the cooling unit 125, the resin structure 13 heated in the impregnation unit 123 (resin structure 13 in which the carbon fiber bundle is impregnated and coated with the melt) is cooled to 50° C. to 150° C., for example. Although the cooling time is not particularly limited, the cooling time is 3 seconds to 30 seconds, for example.

In the taking-up unit 127, the resin structure 13 cooled in the cooling unit 125 is continuously taken up to feed the resin structure 13 to the subsequent cutting unit 129.

In the cutting unit 129, the cooled resin structure 13 is cut to a predetermined length to obtain pellets 15. The cutting unit 129 is equipped with a rotary blade, for example.

The liquid crystal polyester resin composition of the present embodiment may consist of a pellet in which the sizing-agent-coated carbon fibers are hardened with the liquid crystal polyester resin, or may be composed of a pellet mixture including: a pellet in which the sizing-agent-coated carbon fibers are hardened with the liquid crystal polyester resin; and a liquid crystal polyester resin pellet free from any sizing-agent-coated carbon fibers.

A pellet in which the sizing-agent-coated carbon fibers are hardened with the liquid crystal polyester resin may be prepared as the liquid crystal polyester resin composition of the present embodiment by using the above-mentioned preparation device 100 as described below, for example.

<Step of Obtaining Resin Structure>

First, the sizing-agent-coated carbon fiber bundle 11 in which a plurality of single fibers is sized by a sizing-agent is heated and dried in the preheating unit 121 while continuously reeling out the sizing-agent-coated carbon fiber bundle 11 from the carbon fiber roving 10.

Then, the sizing-agent-coated carbon fiber bundle 11 is impregnated with the molding material M in a molten state by supplying the molding material M melt-kneaded by the extruder 120 from the supply port 123a while supplying the dried sizing-agent-coated carbon fiber bundle 11 to the impregnation unit 123. Thus, the resin structure 13 in which the carbon fiber bundle is impregnated and coated with the melt is obtained. Then, the resin structure 13 heated in the impregnation unit 123 is cooled in the cooling unit 125.

In the thus obtained resin structure 13, the carbon fibers are arranged to be substantially parallel to the longitudinal direction of the resin structure 13.

The phrase "the carbon fibers are arranged to be substantially parallel to the longitudinal direction of the resin structure" refers to the state in which the angle formed by the longitudinal direction of the carbon fiber and the longitudinal direction of the resin structure is approximately 0°, and specifically the state in which the angle formed by the longitudinal direction of the carbon fiber and the longitudinal direction of the resin structure is approximately −5° to 5°.

<Step of Obtaining Pellet>

Next, the cooled resin structure 13 is taken up by the taking-up unit 127 in a strand shape, and fed to the cutting unit 129.

Then, the strand-shaped resin structure 13 is cut to a predetermined length in the longitudinal direction thereof in the cutting unit 129 to obtain pellets 15.

The term "predetermined length" of the pellets 15 refers to the length of the pellets 15, which is determined depending on the required performance of a molded body formed from the pellets 15. In the liquid crystal polyester resin composition obtained by the preparation method of the present embodiment, the length of the pellet 15 and the length of the carbon fibers arranged in the pellet 15 are substantially identical to each other.

The phrase "the length of the pellet and the length of the carbon fibers are substantially identical to each other" means that the length-weighted average fiber length of the carbon fibers arranged in the pellet is 95% to 105% of the length of the pellet in the longitudinal direction thereof.

Thus, the pellet 15 composed of the liquid crystal polyester resin composition of the present embodiment is prepared.

In the pellet 15, the sizing-agent-coated carbon fibers are hardened with the liquid crystal polyester resin, and the carbon fibers are arranged to be substantially parallel to the longitudinal direction of the pellet. The length of the carbon fibers arranged in the pellet 15 is substantially identical to the length of the pellet. Although the length of the pellet 15 prepared in the present embodiment depends on the required performance of a molded body formed from the pellet 15, the length thereof is 3 mm to 50 mm, for example.

Thus, the carbon fibers are arranged to be substantially parallel to the longitudinal direction of the pellet, and have a length substantially identical to the length of the pellet, as a result of which, when made into a molded body, the length of the carbon fibers remaining in the molded body can be increased, which is effective in improving the heat resistance of the molded body and alleviating anisotropy.

The arrangement direction of the carbon fibers in the pellet can be confirmed by observing the surface of a section of the pellet cut in the longitudinal direction with a microscope. The length of the carbon fibers in the pellet is measured by the following steps.

Step (1): 2 g of the pellet is heated in a muffle furnace at 500° C. for 3 hours to remove the resin component (liquid crystal polyester resin).

Step (2): The resultant obtained by removing the resin component from the resin pellet is dispersed in 1000 mL of an aqueous solution containing 0.05% by volume of a surfactant (Micro-90 manufactured by INTERNATIONAL PRODUCTS CORPORATION) to obtain a dispersion liquid.

Step (3): 100 mL is taken from the dispersion liquid, and diluted 5 to 20 times with pure water. 50 mL is taken from the diluted dispersion liquid, and is subjected to filtration under reduced pressure using a filter paper (No. 5C) for Kiriyama-rohto φ90 mm, followed by observing carbon fibers dispersed on the filter paper with a microscope (VH-Z25 manufactured by KEYENCE CORPORATION at a magnification of 10× to 20×) to take 10 images per sample without overlapping taken areas.

Step (4): The length of all fibers present in each taken image is measured by a measurement tool of the microscope. The length of bent fibers is measured by multiple-point measurement and the length of fibers contacting with edges of the image is not measured. The same procedure is repeated for the 10 taken images to measure the fiber length until the total number of measured fibers exceeds 500 fibers. In the case where the total number of fibers in the 10 taken images does not exceed 500 fibers, step (3) is repeatedly conducted to appropriately adjust the dilution ratio with pure water, and images are taken again to remeasure the fiber length.

Step (5): The length-weighted average fiber length $lm=(\Sigma li^2 \times ni)/(\Sigma li \times ni)$, $(\Sigma ni>500)$, is determined from the fiber length of the carbon fibers measured in step (4).

li: Fiber length of carbon fibers
ni: Number of carbon fibers having a fiber length of li The preparation method of the liquid crystal polyester resin composition of the present invention has the following aspects.

(51) A preparation method of the liquid crystal polyester resin composition, including a step of mixing a liquid crystal polyester resin and sizing-agent-coated carbon fibers, wherein the formulation amount of the sizing-agent-coated carbon fibers relative to 100 parts by mass of the liquid crystal polyester resin is 5 parts by mass to 120 parts by mass, the adhesion amount of the sizing-agent to the carbon fibers in the sizing-agent-coated carbon fibers relative to 100 parts by mass of the carbon fibers is 0.1 parts by mass to 1.2 parts by mass, and when the sizing-agent-coated carbon fibers are heated in air from 25° C. to 400° C. at a temperature-increase rate of 50° C./min, the mass loss rate thereof within the range of 300° C. to 400° C. is less than 0.8% by mass.

(52) The preparation method of the liquid crystal polyester resin composition according to (51) mentioned above, wherein the preparation method is a method in which a pellet in which the sizing-agent-coated carbon fibers are hardened with the liquid crystal polyester resin is obtained.

(53) The preparation method of the liquid crystal polyester resin composition according to (52) mentioned above, including:

a step of obtaining a resin structure in which carbon fibers are arranged to be substantially parallel to the longitudinal direction of a liquid crystal polyester resin layer by immersing a carbon fiber bundle in which a plurality of single fibers is sized with a sizing-agent with the liquid crystal polyester resin while reeling out the carbon fiber bundle; and a step of obtaining a pellet having a length substantially identical to that of the carbon fibers arranged in the liquid crystal polyester resin layer, by cutting the resin structure to a predetermined length in the longitudinal direction thereof.

(54) The preparation method of the liquid crystal polyester resin composition according to any one of (51) to (53) mentioned above, wherein the mass loss rate is 0.1% by mass to 0.7% by mass, preferably 0.1% by mass to 0.6% by mass, more preferably 0.1% by mass to 0.5% by mas, and even more preferably 0.1% by mass to 0.4% by mass.

(55) The preparation method of the liquid crystal polyester resin composition according to any one of (51) to (54) mentioned above, wherein the incipient fluidization temperature of the liquid crystal polyester resin is 280° C. or more, preferably 280° C. to 400° C., and even more preferably 280° C. to 380° C.

(56) The preparation method of the liquid crystal polyester resin composition according to any one of (51) to (55) mentioned above, wherein the formulation amount of the sizing-agent-coated carbon fibers relative to 100 parts by mass of the liquid crystal polyester resin is 5 parts by mass to 100 parts by mass, preferably 10 parts by mass to 80 parts by mass, and more preferably 18 parts by mass to 67 parts by mass.

(57) The preparation method of the liquid crystal polyester resin composition according to any one of (51) to (56) mentioned above, wherein the adhesion amount of the sizing-agent to the carbon fibers in the sizing-agent-coated carbon fibers relative to 100 parts by mass of the carbon fibers is 0.2 parts by mass to 1.2 parts by mass, preferably 0.2 parts by mass to 1.0 part by mass, and more preferably 0.2 parts by mass to 0.8 parts by mass.

(58) The preparation method of the liquid crystal polyester resin composition according to any one of (51) to (57) mentioned above, wherein the liquid crystal polyester resin composition is a pellet in which the sizing-agent-coated carbon fibers are hardened with the liquid crystal polyester resin.

(Molded Body)

A molded body of the present embodiment is a molded body prepared using the above-mentioned liquid crystal polyester resin composition.

The molded body of the present embodiment is obtained using the liquid crystal polyester resin composition by a conventionally-known molding method. As the molding method of the liquid crystal polyester resin composition of the present embodiment, a melt-molding method is preferable, and examples thereof include an injection-molding method, an extrusion-molding method such as a T-die method and an inflation method, a compression-molding method, and a blow-molding method, a vacuum-molding method and a press-molding method. Among these, an injection-molding method is preferable.

In the case where the above-mentioned liquid crystal polyester resin composition as a molding material is molded by the injection-molding method, the liquid crystal polyester resin composition is molded using a conventionally-known injection molding machine by melting the liquid crystal polyester resin composition and then injecting the melted liquid crystal polyester resin composition into a mold, for example.

Examples of the conventionally-known injection molding machine include TR450EH3 manufactured by Sodick Co., Ltd., and a hydraulic horizontal molding machine manufactured by NISSEI PLASTIC INDUSTRIAL CO., LTD., under the model number of PS40E5ASE.

The cylinder temperature of the injection molding machine is appropriately determined depending on the type of liquid crystal polyester resin, is preferably set at a temperature higher than the incipient fluidization temperature of the used liquid crystal polyester resin by 10° C. to 80° C., and is set at 300° C. to 400° C., for example.

The temperature of the mold is preferably set at room temperature (23° C., for example) to 180° C. from the viewpoint of the cooling rate of the liquid crystal polyester resin composition and the productivity.

Since the molded body of the present embodiment described above uses the liquid crystal polyester resin composition according to the present invention, the strength is further enhanced. The reason why such an effect can be obtained is presumed as follows.

In the liquid crystal polyester resin composition according to the present invention, specific sizing-agent-coated carbon fibers are used with the liquid crystal polyester resin. Since the mass loss rate of the specific sizing-agent-coated carbon fibers within the range of 300° C. to 400° C. is less than 0.8% by mass, the mass reduction is scarcely caused due to heating in the impregnation unit 123 or heating during melt-kneading in the injection molding machine. Therefore, the generation of voids due to decomposition of the sizing-agent or the like is suppressed in the resultant molded body.

Since the voids are mainly generated at the interface between the carbon fibers and the resin, poor adhesion between the resin and the fibers occurs, and the reinforcing effect of the carbon fibers is not sufficiently exhibited. Therefore, the use of the liquid crystal polyester resin composition of the present embodiment makes it possible to obtain a molded body in which the generation of voids is suppressed and mechanical properties such as flexural strength are improved.

The molded body of the present invention has the following aspects.

(101) A molded body prepared using the liquid crystal polyester resin composition of any one of (1) to (19) mentioned above.

The above-mentioned molded body of the present embodiment can be generally applied to every application to which a liquid crystal polyester resin can be applied, and is particularly suitable to application in the automobile field.

Examples of the application in the automobile field include: injection molded bodies as automobile interior packaging materials, such as injection molded bodies as ceiling materials, injection molded bodies as wheel house cover materials, injection molded bodies as trunk room lining materials, injection molded bodies as instrument panel skin materials, injection molded bodies as handle cover materials, injection molded bodies as armrest materials, injection molded bodies as headrest materials, injection molded bodies as seat belt cover materials, injection molded bodies as shift lever boot materials, injection molded bodies as console box materials, injection molded bodies as horn pad materials, injection molded bodies as knob materials, injection molded bodies as airbag cover materials, injection molded bodies as various trim materials, injection molded bodies as pillar materials, injection molded bodies as door lock bezel materials, injection molded bodies as grab box materials, injection molded bodies as defroster nozzle materials, injection molded bodies as scuff plate materials, injection molded bodies as steering wheel materials, and injection molded bodies as steering column cover materials.

Additional examples of the application in the automobile field include: injection molded bodies as automobile exterior packaging materials, such as injection molded bodies as bumper materials, injection molded bodies as spoiler materials, injection molded bodies as mudguard materials, injection molded bodies as side molding materials, injection molded bodies as door mirror housing materials, and injection molded bodies as underbody shield materials.

Examples of other injected molded bodies as automobile part materials include injection molded bodies as automobile head lamp materials, injection molded bodies as glass run channel materials, injection molded bodies as weather strip materials, injection molded bodies as hose materials and injection molded bodies as tube materials such as injection molded bodies as drain hose materials and injection molded bodies as window washer tube materials, injection molded bodies as rack and pinion boot materials, injection molded bodies as gasket materials, injection molded bodies as bumper beam materials, injection molded bodies as various member materials, injection molded bodies as suspension system materials, injection molded bodies as front end module materials, injection molded bodies as radiator support materials, and injection molded bodies as back door inner materials.

In addition to the above applications, the molded body of the present embodiment may be applied to a sensor, an LED lamp, a connector, a socket, a resistor, a relay case, a switch, a coil bobbin, a capacitor, a variable capacitor case, an optical pickup, an oscillator, various terminal boards, a transformer, a plug, a printed circuit board, a tuner, a speaker, a microphone, a headphone, a small motor, a magnetic head base, a power module, a semiconductor, a liquid crystal display, a FDD carriage, a FDD chassi, a motor brush holder, a parabolic antenna, a computer-related part, a microwave part, an acousmato/voice equipment part, a lighting part, an air conditioner part, an office computer-related part, a telephone/FAX-related part, or a copy machine-related part.

EXAMPLES

Hereinafter, the present invention will be explained in further detail with reference to specific examples. However, the present invention is not limited to the examples described below.

[Incipient Fluidization Temperature of Liquid Crystal Polyester]

A cylinder equipped with a die having a nozzle having an inner diameter of 1 mm and a length of 10 mm was filled with approximately 2 g of a liquid crystal polyester using a flow tester (manufactured by Shimadzu Corporation under the model number of "CFT-500"). Then, the liquid crystal polyester was melted and extruded from the nozzle while raising the temperature at a rate of 4° C./min under a load of 9.8 MPa (100 kg/cm$^2$) to measure the temperature at which the viscosity became 4800 Pas (48000 poises) (incipient fluidization temperature) as an incipient fluidization temperature of the liquid crystal polyester.

<Preparation of Liquid Crystal Polyester>

6-Hydroxy-2-naphthoic acid (1034.99 g, 5.5 mol), 2,6-naphthalenedicarboxylic acid (378.33 g, 1.75 mol), terephthalic acid (83.07 g, 0.5 mol), hydroquinone (272.52 g, 2.475 mol, in excess by 0.225 mol relative to the total amount of 2,6-naphthalenedicarboxylic acid and terephthalic acid), acetic anhydride (1226.87 g, 12 mol), and 1-methylimidazole (0.17 g) as a catalyst were charged into a reactor equipped with a stirrer, a torque meter, a nitrogen gas inlet tube, a thermometer and a reflux condenser, and the gas in the reactor was replaced with nitrogen gas, followed by raising the temperature therein from room temperature to 145° C. over 15 minutes while stirring the mixture under a nitrogen gas stream to reflux the mixture at 145° C. for 1 hour.

Then, the temperature was raised from 145° C. to 310° C. over 3.5 hours while distilling off acetic acid produced as a by-product and unreacted acetic anhydride, followed by maintaining the temperature at 310° C. for 3 hours. Then, the resultant was taken out to cool to room temperature, and thus a solid product was obtained. The resultant solid product was pulverized with a pulverizer to obtain a particle size of approximately 0.1 mm to 1 mm. Then, the temperature was raised under a nitrogen atmosphere from room temperature to 250° C. over 1 hour, raised from 250° C. to 310° C. over 10 hours, and then maintained at 310° C. for 5 hours, to allow solid phase polymerization to proceed. After the solid phase polymerization, the resultant was cooled to obtain a powdered liquid crystal polyester.

The thus obtained liquid crystal polyester had, relative to the total amount of all repeating units, 55% by mol of the repeating unit (1) in which $Ar^1$ was a 2,6-naphthylene group, 17.5% by mol of the repeating unit (2) in which $Ar^2$ was a 2,6-naphthylene group, 5% by mol of the repeating unit (2) in which $Ar^2$ was a 1,4-phenylene group, and 22.5% by mol of the repeating unit (3) in which $Ar^a$ was a 1,4-phenylene group, and had an incipient fluidization temperature of 322° C.

<Preparation of Liquid Crystal Polyester Pellet Free from Carbon Fibers>

The resultant powdered liquid crystal polyester was granulated with a twin-screw extruder (manufactured by IKG Corporation under the model number of PMT 47) at a cylinder temperature of 320° C. to obtain liquid crystal polyester pellets free from carbon fibers, the length of the pellets being 3 mm. The incipient fluidization temperature of the thus obtained liquid crystal polyester pellet was 303° C.

<Carbon Fiber Bundle>

Used carbon fiber bundles (CF1) to (CF8) are shown in Table 1.

Sizing-agent-coated carbon fiber bundle (CF1): manufactured by Mitsubishi Chemical Corporation under the trade name of "TR50S15L MB"; the number-average fiber diameter of the carbon fibers was 7 μm, the number of sized fibers was 15000 fibers, and the fineness was 1000 g/1000 m.

Sizing-agent-coated carbon fiber bundle (CF2): manufactured by Mitsubishi Chemical Corporation under the trade name of "TR50S15L GF"; the number-average fiber diameter of the carbon fibers was 7 μm, the number of sized fibers was 15000 fibers, and the fineness was 1000 g/1000 m.

Sizing-agent-coated carbon fiber bundle (CF3): manufactured by Mitsubishi Chemical Corporation under the trade name of "TR50S15L AD"; the number-average fiber diameter of the carbon fibers was 7 μm, the number of sized fibers was 15000 fibers, and the fineness was 1000 g/1000 m.

Sizing-agent-coated carbon fiber bundle (CF4): manufactured by Mitsubishi Chemical Corporation under the trade name of "TR50S12L AL"; the number-average fiber diameter of the carbon fibers was 7 μm, the number of sized fibers was 12000 fibers, and the fineness was 800 g/1000 m.

Sizing-agent-coated carbon fiber bundle (CF5): manufactured by Mitsubishi Chemical Corporation under the trade name of "TR50S15L JJ"; the number-average fiber diameter of the carbon fibers was 7 μm, the number of sized fibers was 15000 fibers, and the fineness was 1000 g/1000 m.

Sizing-agent-coated carbon fiber bundle (CF6): manufactured by Mitsubishi Chemical Corporation under the trade name of "TR50S12L KL"; the number-average fiber diameter of the carbon fibers was 7 μm, the number of sized fibers was 12000 fibers, and the fineness was 800 g/1000 m.

Sizing-agent-coated carbon fiber bundle (CF 7): manufactured by Mitsubishi Chemical Corporation under the trade name of "TR50S12L RN"; the number-average fiber diameter of the carbon fibers was 7 μm, the number of sized fibers was 12000 fibers, and the fineness was 800 g/1000 m.

Carbon fiber bundle uncoated with any sizing-agents (CF8): which was obtained by sizing "TR50S15L" (trade name, manufactured by Mitsubishi Chemical Corporation) with water; the number-average fiber diameter of the carbon fibers was 7 μm, the number of sized fibers was 15000 fibers, and the fineness was 1000 g/1000 m.

[Adhesion Amount of Sizing-Agent in Sizing-Agent-Coated Carbon Fibers]

The adhesion amount of a sizing-agent in sizing-agent-coated carbon fibers in Table 1 was measured as described below.

1 g (W1) of sizing-agent-coated carbon fibers in an absolutely dry state, obtained by drying in a 100 mL Kjeldahl flask at 110° C. for 1 hour and then cooling to 25° C. in a desiccator, was precisely weighed, 50 mL of 95% concentrated sulfuric acid was added thereto, and the mixture was left at 25° C. for 2 hours to decompose a sizing-agent. Then, a glass filter having a mass W2 (g), which was precisely weighed after drying in advance at 110° C. for 1 hour, was used to filtrate carbon filters and then washed with approximately 1000 mL of water. Then, the glass filter including the carbon fibers were dried at 110° C. for 1 hour, and then cooled in a desiccator to 25° C., followed by precisely weighing the mass (W3 (g)) of the glass filter including the carbon fibers. The adhesion amount of the sizing-agent was determined in accordance with the following equation.

$$\text{Adhesion amount of sizing-agent(\% by mass)} = (W1 - W3 + W2) \times 100 / W1$$

The thus determined adhesion amount of the sizing-agent was used to determine the ratio (parts by mass) thereof relative to 100 parts by mass of carbon fibers as the adhesion amount of the sizing-agent to the carbon fibers.

$$\text{Adhesion amount of sizing-agent(parts by mass)} \\ \text{relative to 100 parts by mass of carbon fibers} = \\ (W1 - W3 + W2) \times 100 / (W3 - W2)$$

[Mass Loss Rate of Sizing-Agent-Coated Carbon Fibers]

The mass loss rate of the sizing-agent-coated carbon fibers in Table 1 was measured by conducting a thermogravimetric analysis (TGA). When a sizing-agent-coated carbon fiber bundle was heated in air from 25° C. to 400° C. at a temperature-increase rate of 50° C./min, the mass loss rate (% by mass) thereof within the range of 300° C. to 400° was determined using the mass $W_{300}$ at 300° C. and the mass $W_{400}$ at 400° C. in accordance with the following equation.

$$\text{Mass loss rate(\% by mass)} = (W_{300} - W_{400}) / W_{300} \times 100$$

TABLE 1

| | Carbon fiber bundle | | | | | | | |
|---|---|---|---|---|---|---|---|---|
| | (CF1) | (CF2) | (CF3) | (CF4) | (CF5) | (CF6) | (CF7) | (CF8) |
| Fiber | Carbon fibers | | | | | | | |
| Sizing-agent | Nylon-based polymer | Polyether-based polymer | Epoxy-based polymer | Epoxy-based polymer | Modified epoxy-based polymer | Epoxy and ester-based polymer | Urethane-based polymer | Absent |
| Adhesion amount of sizing-agent relative to 100 parts by mass of carbon fibers (parts by mass) | 0.2 | 0.6 | 0.4 | 1.2 | 1.0 | 1.2 | 1.4 | 0 |
| Mass loss rate (% by mass) | 0.29 | 0.39 | 0.24 | 0.49 | 0.42 | 0.81 | 0.80 | — |

<Preparation of Liquid Crystal Polyester Resin Composition>

Examples 1 to 6 and Comparative Examples 1 to 6

Liquid crystal polyester resin compositions were prepared using the powdered liquid crystal polyesters obtained in the above-mentioned <Preparation of liquid crystal polyester>, liquid crystal polyester pellets obtained in the above-mentioned <Preparation of liquid crystal polyester pellet free from carbon fibers>, and the above-mentioned carbon fiber bundles (CF1) to (CF8).

Example 1

A pellet-shaped liquid crystal polyester resin composition was obtained as described below using the same preparation device as shown in FIG. 1. A GTS-40 type extruder (manufactured by PLABOR Research Laboratory of Plastics Technology Co., Ltd) was used as the extruder 120. EBD-1500A (manufactured by AIMEX CO., LTD.) was used as a belt type taking-up machine.
<Step of Obtaining Resin Structure>

The sizing-agent-coated carbon fiber bundle (CF1) 11 was heated and dried at 150° C. in the preheating unit 121 while continuously reeling out the sizing-agent-coated carbon fiber bundle (CF1) 11 from the carbon fiber roving 10 by operating the belt-type take-up machine (take-up unit 127) at a take-up speed of 10 m/min.

Separately, the liquid crystal polyester pellet free from carbon fibers obtained in the above-mentioned <Preparation of liquid crystal polyester pellet free from carbon fibers> was heated at 380° C. to make it in a molten state using the extruder 120.

Then, the liquid crystal polyester (molding material M) in a molten state was supplied from the extruder 120 through the supply port 123a into a die (impregnation unit 123) attached to the tip of the extruder 120 while supplying the dried sizing-agent-coated carbon fiber bundle 11 thereinto. In the die (impregnation unit 123), the liquid crystal polyester was melted at 380° C. to impregnate the sizing-agent-coated carbon fiber bundle (CF1) therewith to obtain the resin structure 13 having 67 parts by mass of the sizing-agent-coated carbon fiber bundle (CF1) relative to 100 parts by mass of the liquid crystal polyester by adjusting the strand diameter using a die head having a nozzle diameter of 1.5 mm at an outlet of the die (impregnation unit 123). In the thus obtained resin structure 13, carbon fibers were arranged to be substantially parallel to the longitudinal direction of the liquid crystal polyester resin layer.

Then, the resin structure 13 heated in the die (impregnation unit 123) was cooled to 150° C. or lower in a cooling unit 125.
<Step of Obtaining Pellet>

Then, the cooled resin structure 13 was taken up in a strand shape by the belt-type taking-up machine (taking-up unit 127) to feed to a pelletizer (cutting unit 129) and cut to a predetermined length in the longitudinal direction thereof, thereby obtaining pellets 15 having a cylindrical shape (having a length of 12 mm).

The pellet 15 was cut in the longitudinal direction thereof, and the surface of the resultant section was observed with a microscope. As a result of the observation, it was confirmed that the arrangement direction of the carbon fibers was substantially identical to the longitudinal direction of the pellet and substantially parallel to the longitudinal direction of the pellet.

The length of the carbon fiber in the pellet was measured by the following steps.

Step (1): 2 g of the pellet was heated at 500° C. for 3 hours in a muffle furnace to remove the resin component (liquid crystal polyester resin).

Step (2): The resultant obtained by removing the resin component from the resin pellet was dispersed in 1000 mL of an aqueous solution containing 0.05% by volume of a surfactant (Micro-90 manufactured by INTERNATIONAL PRODUCTS CORPORATION) to obtain a dispersion liquid.

Step (3): 100 mL was taken from the dispersion liquid, and diluted 10 times with pure water. 50 mL was taken from the diluted dispersion liquid and was subjected to filtration under reduced pressure using a filter paper (No. 5C) for Kiriyama-rohto φ90 mm, followed by observing carbon fibers dispersed on the filter paper with a microscope (VH-Z25, manufactured by KEYENCE CORPORATION at a magnification of 10×) to take 10 images per sample without overlapping taken areas.

Step (4): The length of all fibers present in each taken image was measured by a measurement tool of the microscope. The length of bent fibers was measured by multiple-point measurement and the length of fibers contacting with edges of the image was not measured. The same procedure was repeated for the 10 taken images to measure the fiber length until the total number of measured fibers exceeded 500 fibers.

Step (5): The length-weighted average fiber length $lm = (\Sigma li^2 \times ni)/(\Sigma li \times ni)$, ($\Sigma ni > 500$), was determined from the fiber length of the carbon fibers measured in step (4).

li: Fiber length of carbon fibers ni: Number of carbon fibers having a fiber length of li As a result, the length-weighted average fiber length of the carbon fibers was identical to the length of the pellet (12 mm).

Example 2

Pellets having a cylindrical shape (having a length of 12 mm) were obtained by the same method as that in Example 1 except that the sizing-agent-coated carbon fiber bundle (CF2) shown in Table 1 was used instead of the sizing-agent-coated carbon fiber bundle (CF1).

Example 3

Pellets having a cylindrical shape (having a length of 12 mm) were obtained by the same method as that in Example 1 except that the sizing-agent-coated carbon fiber bundle (CF3) shown in Table 1 was used instead of the sizing-agent-coated carbon fiber bundle (CF1).

The resultant pellets were mixed with the liquid crystal polyester pellet prepared in the above-mentioned <Preparation of liquid crystal polyester pellet free from carbon fibers> such that 18 parts by mass of the sizing-agent-coated carbon fiber bundle (CF3) were contained relative to 100 parts by mass of the liquid crystal polyester to obtain a pellet mixture.

Example 4

Pellets having a cylindrical shape (having a length of 12 mm) were obtained by the same method as that in Example 1 except that the sizing-agent-coated carbon fiber bundle (CF3) shown in Table 1 was used instead of the sizing-agent-coated carbon fiber bundle (CF1).

Example 5

A resin structure 13 having 67 parts by mass of the sizing-agent-coated carbon fiber bundle (CF4) relative to 100 parts by mass of the liquid crystal polyester was obtained by the same method as that in Example 1 except that the sizing-agent-coated carbon fiber bundle (CF4) shown in Table 1 was used instead of the sizing-agent-coated carbon fiber bundle (CF1) and a die head having a nozzle diameter of 1.3 mm was used at an outlet of the die (impregnation unit 123). Pellets having a cylindrical shape (having a length of 12 mm) were obtained from the resin structure 13 by the same method as that in Example 1.

Example 6

Pellets having a cylindrical shape (having a length of 12 mm) were obtained by the same method as that in Example 1 except that the sizing-agent-coated carbon fiber bundle (CF5) shown in Table 1 was used instead of the sizing-agent-coated carbon fiber bundle (CF1).

Comparative Example 1

Pellets having a cylindrical shape (having a length of 12 mm) were obtained by the same method as that in Example 1 except that the sizing-agent-coated carbon fiber bundle (CF6) shown in Table 1 was used instead of the sizing-agent-coated carbon fiber bundle (CF1) and a die head having a nozzle diameter of 1.3 mm was used at an outlet of the die (impregnation unit 123).

Comparative Example 2

Pellets having a cylindrical shape (having a length of 12 mm) were obtained by the same method as that in Example 1 except that the sizing-agent-coated carbon fiber bundle (CF4) shown in Table 1 was used instead of the sizing-agent-coated carbon fiber bundle (CF1) and a die head having a nozzle diameter of 1.3 mm was used at an outlet of the die (impregnation unit 123).

The resultant pellets were mixed with the liquid crystal polyester pellet prepared in the above-mentioned <Preparation of liquid crystal polyester pellet free from carbon fibers> such that 3 parts by mass of the sizing-agent-coated carbon fiber bundle (CF4) were contained relative to 100 parts by mass of the liquid crystal polyester to obtain a pellet mixture.

Comparative Example 3

Pellets having a cylindrical shape (having a length of 12 mm) were obtained by the same method as that in Example 1 except that the sizing-agent-coated carbon fiber bundle (CF7) shown in Table 1 was used instead of the sizing-agent-coated carbon fiber bundle (CF1) and a die head having a nozzle diameter of 1.3 mm was used at an outlet of the die (impregnation unit 123).

The resultant pellets were mixed with the liquid crystal polyester pellet prepared in the above-mentioned <Preparation of liquid crystal polyester pellet free from carbon fibers> such that 18 parts by mass of the sizing-agent-coated carbon fiber bundle (CF7) were contained relative to 100 parts by mass of the liquid crystal polyester to obtain a pellet mixture.

Comparative Example 4

Pellets having a cylindrical shape (having a length of 12 mm) were obtained by the same method as that in Example 1 except that the sizing-agent-coated carbon fiber bundle (CF7) shown in Table 1 was used instead of the sizing-agent-coated carbon fiber bundle (CF1) and a die head having a nozzle diameter of 1.3 mm was used at an outlet of the die (impregnation unit 123).

Comparative Example 5

A resin structure 13 having 125 parts by mass of the sizing-agent-coated carbon fiber bundle (CF1) relative to 100 parts by mass of the liquid crystal polyester was obtained by the same method as that in Example 1 except that a die head having a nozzle diameter of 1.1 mm was used at an outlet of the die (impregnation unit 123). Pellets having a cylindrical shape (having a length of 12 mm) were obtained from the resin structure 13 by the same method as that in Example 1.

Comparative Example 6

In the case where a carbon fiber bundle (CF8) in which the adhesion amount of a sizing-agent was 0 parts by mass was used, fibers snaggled when reeled out from a roving at the preparation step of the pellets, and therefore no liquid crystal polyester resin composition could be prepared.

<Preparation of Molded Body>

The liquid crystal polyester resin composition (pellet) of each example was melt-kneaded in an injection molding machine TR450EH3 (manufactured by Sodick Co., Ltd.) at a molding temperature of 360° C., and then injected into a mold at 100° C. at an injection speed of 50 mm/second, to prepare a multipurpose test piece (type A1) (having a thickness of 4 mm) conforming to JIS K7139. The gate was a film gate having a thickness of 0.5 mm from the upper side of the grip portion on one side of the multipurpose test piece.

Additional injection conditions: The screw rotation speed was set at 250 rpm, the holding pressure was set at 100 MPa for 5 seconds, and the back pressure was set at 5 MPa.

[Flexural Strength and Flexural Modulus of Molded Body]

Five plate-shaped test pieces were cut from the resultant multipurpose test piece such that the shape thereof was unnotched and had a width of 10 mm, a length of 80 mm and a thickness of 4 mm. The flexural strength and the flexural modulus of the resultant 5 plate-shaped test pieces were measured five times in accordance with ISO 178. Each average value of measured values was adopted as the flexural strength and the flexural modulus of the molded body. The results are shown in Table 2.

[Charpy Impact Strength of Molded Body]

Five plate-shaped test pieces (having a width of 10 mm, a length of 80 mm and a thickness of 4 mm, and being unnotched) were obtained from the multipurpose test piece obtained by injection-molding as described above. Unnotched Charpy impact strength of the 5 plate-shaped test pieces was measured in accordance with ISO 179 five times. The average value of measured values was adopted as the Charpy impact strength of the molded body. The results thereof are shown in Table 2.

TABLE 2

|  |  | Ex. 1 | Ex. 2 | Ex. 3 | Ex. 4 | Ex. 5 | Ex. 6 | C. Ex. 1 | C. Ex. 2 | C. Ex. 3 | C. Ex. 4 | C. Ex. 5 |
|---|---|---|---|---|---|---|---|---|---|---|---|---|
| Liquid crystal polyester (parts by mass) | | 100 | 100 | 100 | 100 | 100 | 100 | 100 | 100 | 100 | 100 | 100 |
| Sizing-agent-coated carbon fiber bundle (parts by mass) | (CF1) | 67 | | | | | | | | | | 125 |
| | (CF2) | | 67 | | | | | | | | | |
| | (CF3) | | | 18 | 67 | | | | | | | |
| | (CF4) | | | | | 67 | | | 3 | | | |
| | (CF5) | | | | | | 67 | | | | | |
| | (CF6) | | | | | | | 67 | | | | |
| | (CF7) | | | | | | | | | 18 | 67 | |
| Flexural strength | MPa | 281 | 280 | 282 | 281 | 270 | 276 | 190 | 197 | 238 | 176 | Could not be molded |
| Flexural modulus | GPa | 33 | 33 | 18 | 32 | 32 | 32 | 30 | 10 | 17 | 27 | |
| Charpy impact strength | KJ/m$^2$ | 10 | 10 | 22 | 11 | 8 | 9 | 8 | 27 | 21 | 7 | |

(Ex.: Example, C. Ex.: Comparative Example)

It was confirmed from the results shown in Table 2 that the molded bodies prepared using the liquid crystal polyester resin compositions of Examples 1 to 6 according to the present invention had a larger flexural strength and an enhanced strength in comparison to the molded bodies prepared using the liquid crystal polyester resin compositions of Comparative Examples 1 to 5.

EXPLANATION OF REFERENCE NUMERALS

100 Preparation device
101 to 109 Transfer roll
120 Extruder
121 Preheating unit
123 Impregnation unit
125 Cooling unit
127 Taking-up unit
129 Cutting unit

The invention claimed is:

1. A liquid crystal polyester resin composition, comprising:
    a liquid crystal polyester resin; and
    sizing-agent-coated carbon fibers, wherein
    an amount of the sizing-agent-coated carbon fibers relative to 100 parts by mass of the liquid crystal polyester resin is 5 parts by mass to 120 parts by mass,
    an adhesion amount of a sizing agent to carbon fibers in the sizing-agent-coated carbon fibers relative to 100 parts by mass of the carbon fibers is 0.1 parts by mass to 1.2 parts by mass,
    the liquid crystal polyester resin composition is a pellet in which the sizing-agent-coated carbon fibers are hardened with the liquid crystal polyester resin,
    the carbon fibers are arranged to be parallel to a longitudinal direction of the pellet and have a length identical to a length of the pellet, and
    when the sizing-agent-coated carbon fibers are heated in air from 25° C. to 400° C. at a temperature-increase rate of 50° C./min, a mass loss rate of the sizing-agent-coated carbon fibers within a range of 300° C. to 400° C. is less than 0.8% by mass, the mass loss rate being determined by an equation:

the mass loss rate(% by mass)=$(W_{300}-W_{400})/W_{300} \times 100$ wherein $W_{300}$ is a mass of the sizing-agent-coated carbon fibers measured at 300° C. and $W_{400}$ is a mass of the sizing-agent-coated carbon fibers measured at 400° C.

2. The liquid crystal polyester resin composition according to claim 1, wherein an incipient fluidization temperature of the liquid crystal polyester resin is 280° C. or more.

3. The liquid crystal polyester resin composition according to claim 1, wherein the length of the pellet is 3 mm to 50 mm.

4. A molded body prepared using a liquid crystal polyester resin composition of claim 1.

5. A preparation method of a liquid crystal polyester resin composition, comprising mixing a liquid crystal polyester resin and sizing-agent-coated carbon fibers, wherein
    a formulation amount of the sizing-agent-coated carbon fibers relative to 100 parts by mass of the liquid crystal polyester resin is 5 parts by mass to 120 parts by mass,
    an adhesion amount of a sizing agent to carbon fibers in the sizing-agent-coated carbon fibers relative to 100 parts by mass of the carbon fibers is 0.1 parts by mass to 1.2 parts by mass, and
    when the sizing-agent-coated carbon fibers are heated in air from 25° C. to 400° C. at a temperature-increase rate of 50° C./min, a mass loss rate of the sizing-agent-coated carbon fibers within a range of 300° C. to 400° C. is less than 0.8% by mass, the mass loss rate being determined by an equation:

the mass loss rate(% by mass)=$(W_{300}-W_{400})/W_{300} \times 100$ wherein $W_{300}$ is a mass of the sizing-agent-coated carbon fibers measured at 300° C. and $W_{400}$ is a mass of the sizing-agent-coated carbon fibers measured at 400° C.

6. The preparation method of a liquid crystal polyester resin composition according to claim 5, wherein the preparation method is a method of obtaining a pellet in which the sizing-agent-coated carbon fibers are hardened with the liquid crystal polyester resin, and comprises:
    obtaining a resin structure in which carbon fibers are arranged to be parallel to a longitudinal direction of a liquid crystal polyester resin layer, by immersing a carbon fiber bundle in which a plurality of single fibers is sized with a sizing agent with the liquid crystal polyester resin while reeling out the carbon fiber bundle, and
    obtaining the pellet having a length identical to a length of the carbon fibers arranged in the liquid crystal polyester resin layer by cutting the resin structure to a predetermined length in a longitudinal direction thereof.

* * * * *